US007123938B2

(12) United States Patent
Koga et al.

(10) Patent No.: US 7,123,938 B2
(45) Date of Patent: Oct. 17, 2006

(54) CARD DEVICE, ELECTRONIC APPARATUS, AND WIRELESS DEVICE

(75) Inventors: Shouichi Koga, Iizuka (JP); Michinori Kishimoto, Fukuoka (JP); Toshiyuki Wakisaka, Iizuka (JP); Masami Wada, Kasuya-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 525 days.

(21) Appl. No.: 10/198,619

(22) Filed: Jul. 17, 2002

(65) Prior Publication Data

US 2003/0017849 A1 Jan. 23, 2003

(30) Foreign Application Priority Data

Jul. 19, 2001 (JP) ............................ 2001-220406

(51) Int. Cl.
*H04B 1/38* (2006.01)
*H04M 1/00* (2006.01)

(52) U.S. Cl. ...................... 455/558; 455/557; 455/101; 361/764

(58) Field of Classification Search ................ 455/557, 455/558, 101, 556.1, 107, 129; 343/700 MS, 343/720, 829, 846; 361/763, 764, 737
See application file for complete search history.

(56) References Cited

U.S. PATENT DOCUMENTS

| | | | | |
|---|---|---|---|---|
| 5,557,288 | A | 9/1996 | Kato et al. | |
| 6,034,638 | A | 3/2000 | Thiel et al. | |
| 6,061,025 | A | 5/2000 | Jackson et al. | |
| 6,223,990 | B1 * | 5/2001 | Kamei | 235/492 |
| 6,283,369 | B1 * | 9/2001 | Kurokawa et al. | 235/380 |
| 6,400,931 | B1 * | 6/2002 | Inkinen et al. | 455/90.1 |
| 6,742,117 | B1 * | 5/2004 | Hikita et al. | 713/172 |
| 6,774,849 | B1 * | 8/2004 | Umehara et al. | 343/700 MS |
| 6,898,426 | B1 * | 5/2005 | Matsuoka | 455/425 |
| 2002/0014529 | A1 * | 2/2002 | Tanaka | 235/449 |
| 2003/0051178 | A1 * | 3/2003 | Liu | 713/300 |
| 2003/0189483 | A1 * | 10/2003 | Saitoh et al. | 340/10.1 |
| 2004/0222923 | A1 * | 11/2004 | Erkocevic | 343/700 MS |

FOREIGN PATENT DOCUMENTS

| | | |
|---|---|---|
| EP | 0 735 609 A1 | 10/1996 |
| EP | 0 862 278 A2 | 9/1998 |
| JP | 5-335826 | 12/1993 |
| JP | 07-131229 | 5/1995 |
| JP | 7-263941 | 10/1995 |
| JP | 8-101900 | 4/1996 |
| JP | 09-326626 | 12/1997 |
| JP | 10-075192 | 3/1998 |
| JP | 2851587 | 11/1998 |
| JP | 3004533 | 11/1999 |
| JP | 2001-119222 | 4/2001 |
| JP | 3251680 | 11/2001 |
| WO | WO-99/54956 A2 | 10/1999 |
| WO | WO-01/31733 A1 | 5/2001 |

* cited by examiner

*Primary Examiner*—Edan Orgad
(74) *Attorney, Agent, or Firm*—Darby & Darby

(57) ABSTRACT

A card device to be inserted into a slot of an electronic apparatus having an electronic apparatus ground and electrically connected to this electronic apparatus, including a single antenna provided on a carrier, a card ground which is disposed on the carrier and electrically connected to the antenna, and a switch for carrying out, at a high frequency, a connection/disconnection of the card ground to/from the electronic apparatus ground in a condition where this card device is inserted in the slot.

14 Claims, 7 Drawing Sheets

CARD DEVICE, ELECTRONIC APPARATUS, AND WIRELESS DEVICE

BACKGROUND OF THE INVENTION

1. Field of the Invention

The present invention relates to a small-sized card device to be detachably inserted into a slot of an electronic apparatus and, particularly, to a wireless device wherein effects of diversity can be obtained even with a small size.

2. Description of the Related Art

In recent years, wireless devices such as card devices which include antennas and provide electronic apparatuses with wireless communications functions have been widely used. Card devices of this type are typified by wireless LAN cards and card-type modems. In addition, card devices for the addition of wireless communications functions also provide additional system resources such as memories.

In addition, wireless devices of this type include devices that have a plurality of antennas and in that antenna diversity has been realized. Satisfactory communications conditions are easily obtained when antenna diversity relieves harmful influences due to phasing.

In further detail, a space diversity scheme is used, wherein two or more antennas are arranged so as to be physically separated and one of the antennas with the superior communications condition is selected. Namely, a contrivance has been made so that, by separating the antenna positions, the antennas are not electrically coupled to each other and the individual antennas have unique radiation characteristics.

Smaller and lighter wireless devices have been demanded for wireless devices of this type. For example, when a radio wave having a 2.4 GHz band is used, it is possible to mount two antennas on wireless devices as long as they approximate the size of a Personal Computer Memory Card International Association (PCMCIA) card.

However, if the device becomes smaller than this size, e.g., for reasons concerning space, it is difficult to mount two antennas in a separate fashion, and in most cases, only one antenna can be mounted. In these cases, no space diversity effects are obtained.

In regard hereto, wireless devices having small-sized chips as antennas have been put into market circulation, however, even if such small-sized antennas are used, problems similar to the foregoing exist.

OBJECTS AND SUMMARY OF THE INVENTION

Therefore, it is an object of the present invention to provide a card device in which, while a single antenna is used, effects similar to those of antenna diversity can also be obtained.

In addition, it is another object of the present invention to provide a wireless device in which effects of diversity can be obtained even with a small size where effects of space diversity have normally not been obtained.

A card device according to the first aspect of the invention is to be inserted into a slot of an electronic apparatus having an electronic apparatus ground and being electrically connected to the electronic apparatus. The card device includes a carrier, a single antenna provided on the carrier, a card ground which is disposed in the carrier and electrically connected to the antenna, and a switch for carrying out, at a high frequency, a connection/disconnection of the card ground to/from the electronic apparatus ground in a condition where the card device is inserted in the slot.

In this construction, even with only a single antenna, two types of radiation characteristics concerning (1) a condition where the card ground and the electronic apparatus ground are connected at a high frequency and (2) a condition where the card ground and the electric apparatus ground are disconnected at a high frequency, can be obtained by changing over the switch.

In general, the radiation characteristics of an antenna may depend on the characteristics of the antenna itself and a card ground pattern. However, if a card ground is connected to an electronic apparatus ground at a high frequency, the radiation characteristics of the antenna are influenced by the electronic apparatus ground.

It is not necessarily appropriate to determine which of these two conditions is more preferable. However, in a case where the electronic apparatus ground successfully resonates, an improvement in the antenna performance (antenna gain, directivity, etc.) can be expected in the connected condition rather than in the disconnected condition.

As such, one of the two types of radiation characteristics can be selected using a single antenna, and effects similar to those of antenna diversity can be obtained, whereby communication states can be improved. In addition, accordingly, a reduction in size of the card device can be promoted in reality.

According to the second aspect of the invention, a card device includes a demodulating unit which accepts a signal received by the antenna for demodulation, a judging unit which accepts the demodulated signal from the demodulating unit and judges the quality of the communications state of the antenna, and a control unit for controlling the switch with reference to the judgment result of the judging unit.

With this construction, the card device itself selects a more preferable condition, therefore, convenience can be improved. In addition, since it is unnecessary to control an antenna changeover at the electronic apparatus side, no additional load is imposed on the electronic apparatus.

For the third aspect of the invention, the antenna is a $\lambda/4$ chip antenna exposed outside the carrier. With this construction, a reduction in size of the card device can be more easily carried out. In this antenna, a material having a high dielectric constant is used, and where a relative dielectric constant, a reduction in size equal to $\lambda/4\sqrt{}$ can be achieved.

A wireless device according to the fifth aspect of the invention includes an antenna and a coupling element that is electrically coupled to the antenna, wherein the electrical characteristics of the coupling element are made variable, so that a plurality of radiation characteristics can be obtained by the antenna.

A wireless device according to the sixth aspect of the invention includes an antenna, a wireless module that feeds electrical power to the antenna and transmits information via the antenna. Additionally, the device includes a coupling element that is arranged to be contiguous with the antenna and electrically coupled to the antenna, and a variable impedance device provided between the coupling element and a ground point, wherein the wireless module operates the variable impedance device to change the impedance between the coupling element and the ground point, so that a plurality of radiation characteristics are obtained by the antenna.

In the prior art, research has been carried out so that a plurality of antennas has respectively unique radiation characteristics, that is, in only one direction so as to avoid electrical coupling between antennas. In contrast thereto, the present invention has made use of such electrical coupling to the contrary and has revealed that by changing the degree of electrical coupling, a plurality of radiation characteristics can be obtained using one antenna (that is, effects of diversity can be provided), as described in more detail herein.

Based on the above knowledge, the present invention carries out the construction as above, and the merits provided such that:

(1) effects of diversity can be obtained without preparing a plurality of antennas;

(2) only electrical characteristics of the coupling element are changed and the antenna itself is not changed over, therefore, unlike the normal antenna diversity, no instantaneous interruption of the path for receiving a signal from the antenna occurs; and (3) it is unnecessary to excessively separate the antenna and coupling element (in the prior art, this element corresponds to another antenna in terms of the arrangement) and it is rather preferable that these are made approximate, therefore, the components can be laid out in a concentrated fashion, which is advantageous in a case where the components are mounted onto a small-sized wireless device.

In a wireless device according to the seventh aspect of the invention, the variable impedance device varies impedance between the two levels of high impedance and low impedance. This allows two types of radiation characteristics to be obtained and effects of diversity can be obtained with a simple construction. For example, the variable impedance device can be a simple switch (with ON, the impedance is 0: with OFF, the impedance is infinite).

In a wireless device according to the eighth aspect of the invention, the coupling element is an antenna element to which no electrical power is fed. Thus, the coupling element can be provided as a component of the same type as the antenna, therefore, the number of component types can be reduced and a reduction in costs can be realized.

In a wireless device according to the ninth aspect of the invention, the coupling element is a circuit pattern and an original constituent of a wireless device can be utilized as a coupling element, whereby a reduction in costs can be realized.

In a wireless device according to the tenth aspect of the invention, the coupling element is a component of an electronic apparatus to which this wireless device is attached. Thus, by diverting a component of an electronic apparatus into the coupling element, the number of components can be reduced, which is advantageous in terms of cost and layout.

A wireless device according to the eleventh aspect of the invention includes a substrate, a plurality of surface-mounted antennas that are arranged to be contiguous with each other on one surface of the substrate and are also electrically coupled to each other. Additionally, the device includes an antenna switch for selecting an antenna for use for communications, and a wireless module which outputs an antenna changeover signal to the antenna switch, feeds electrical power to an antenna selected by the antenna switch, and transmits information via this antenna.

With this construction, even in a case where the mounting area of the antenna is narrow and effects of space diversity are hardly obtainable, effects of directional diversity can be obtained. In addition, since surface-mounted antennas are arranged on one surface of the substrate in a concentrated fashion, the thickness of the wireless device can be reduced.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 9(*b*) is a partially enlarged and cut-away view of the headphone of FIG. 9(*a*);

DETAILED DESCRIPTION OF THE PREFERRED EMBODIMENTS

Figure 1:
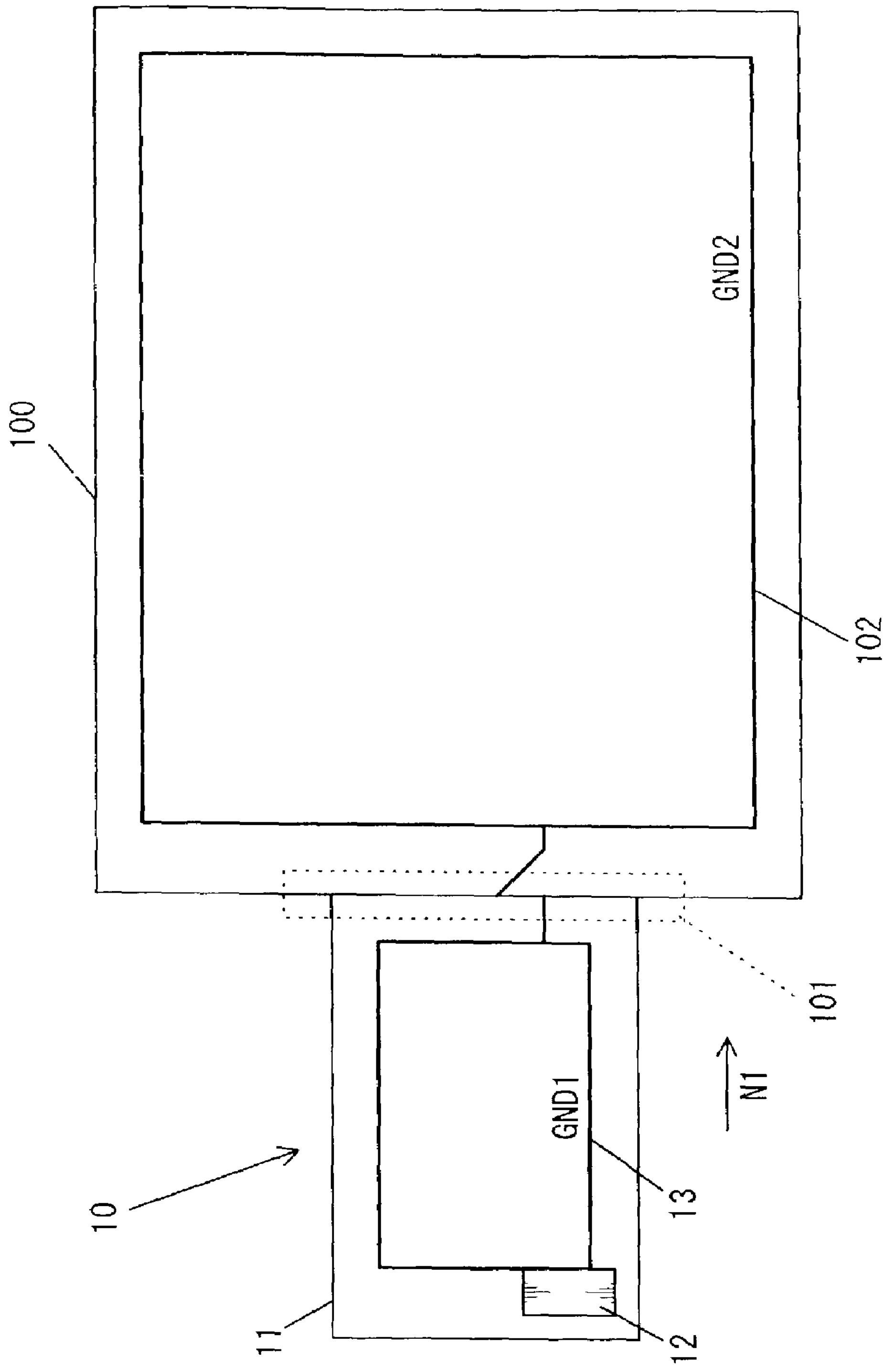
FIG. 1 is a schematic plan view of a card device and an electronic apparatus according to a first embodiment of the present invention.

Referring now to FIG. 1, a schematic plan view of a card device and an electronic apparatus according to a first embodiment of the present invention are illustrated. A card device 10 is detachably inserted (in the direction of arrow N1) into a slot 101 of an electronic apparatus 100, thereby providing electronic apparatus 100 with wireless communications functions. Electronic apparatus 100 can be any of a variety of information processing units such as personal computers (either laptops or desktops), personal digital assistants (PDAs), and digital cameras. Electronic apparatus 100 include electronic apparatus grounds 102 inside thereof. However, electronic apparatus grounds 102 vary in size and shape, depending on the individual apparatus, and in general, whether or not electronic apparatus ground 102 contributes to an improvement in the characteristics of an antenna 12 or the degree of contribution is unknown.

In addition, card device 10 has a carrier 11 formed into a card shape and a single antenna 12 provided on carrier 11. Antenna 12, where the wavelength of a radio wave to be used for communications is provided as λ, a λ/4 chip antenna is used. This chip antenna allows for a reduction in size of the card device, and the chip antenna can be easily installed.

Antenna 12 can also be constructed using a circuit pattern. Similar to electronic apparatus 100, card device 10 also has a card ground 13 inside carrier 11. Additionally, card ground 13 and electronic apparatus ground 102 may be formed as circuit patterns on a printed circuit board. In general, a printed circuit board is provided inside carrier 11.

Figure 2:
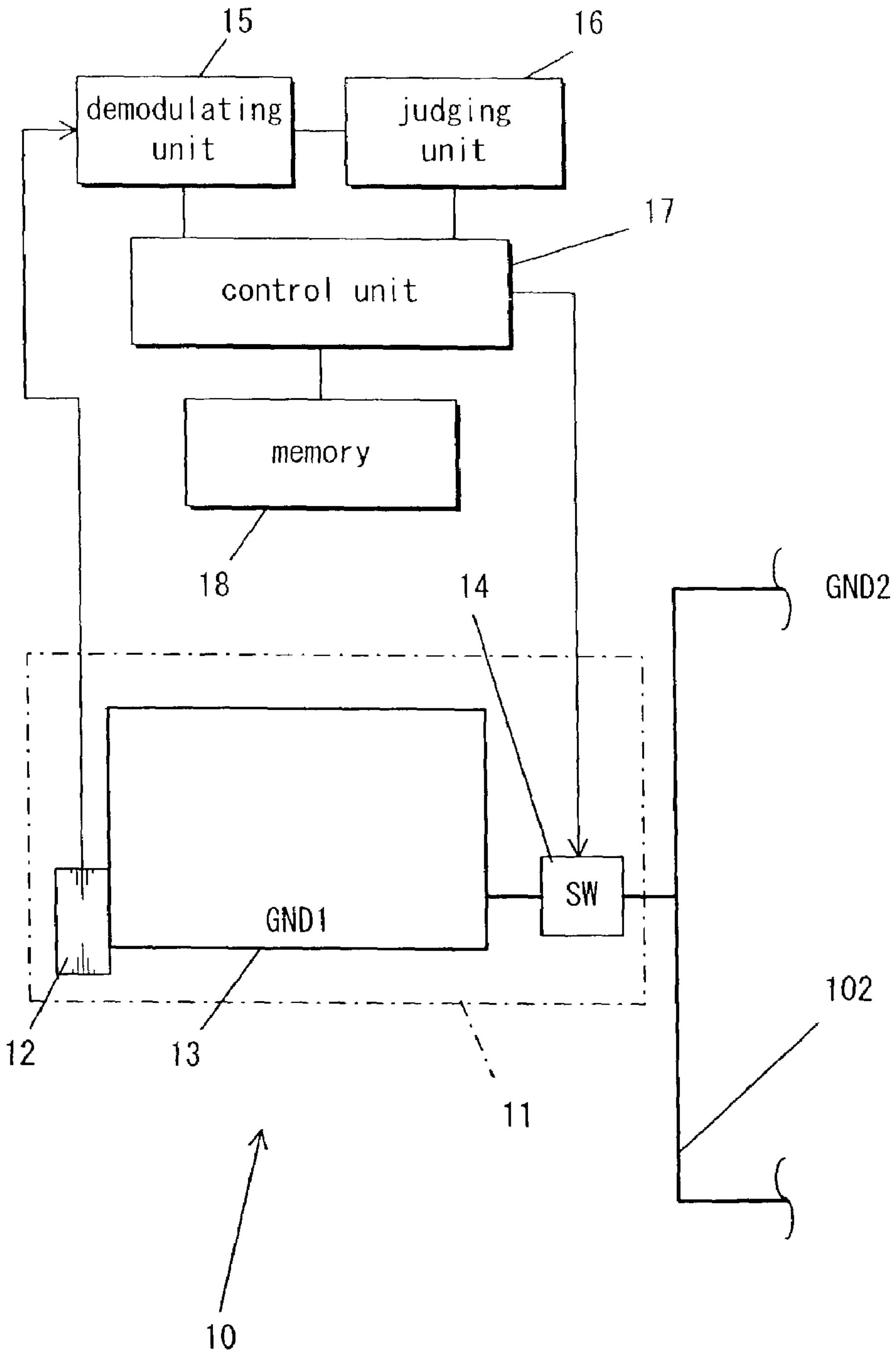
FIG. 2 is a functional block diagram of the card device according to the first embodiment of the present invention.

Referring now to FIG. 2, construction of card device 10, which is a wireless device according to the first embodiment, will be described. FIG. 2 is a functional block diagram of the card device according to the first embodiment of the present invention.

In FIG. 2, a card device 10 is inserted into slot 101, and a switch 14 having two positions is used. A first position connects card ground 13 to electronic apparatus ground 102 and a second position disconnects card ground 13 from electronic apparatus ground 102. Switch 14 changes from the first position to the second position numerous times in response to a changeover signal from a control unit 17. When card device 10 is inserted into slot 101, irrespective of the changeover signal from control unit 17, card ground 13 and electronic apparatus ground 102 are connected to each other.

In addition, a demodulating unit 15 accepts a signal received by the antenna 12 for demodulation and outputs the demodulated signal to a judging unit 16. Judging unit 16 accepts the demodulated signal and judges whether or not the communications state of the current antenna 12 is satisfactory. As a judgment criteria for judging unit 16, any criteria such as a bit error rate, a cyclic redundancy check (CRC), or intensity of the demodulated signal can be arbitrarily selected as long as it can be an objective indicator of the communications state of antenna 12.

Control unit 17 controls demodulating unit 15, judging unit 16, and switch 14. Control unit 17 stores the judgment results of judging unit 16 in a memory 18 and also outputs, with reference to the information stored in the memory 18, a changeover signal to switch 14. This allows the most preferable communications condition to be selected.

Furthermore, control unit 17 may output, with reference to the information of the memory 18, a changeover signal to switch 14 so as to maintain one condition at all times, or alternatively, when communications are carried out by use of a plurality of channels with different frequencies, control unit 17 may change over switch 14 for each channel, if necessary.

In addition, for the first embodiment, demodulating unit 15, judging unit 16, control unit 17, and memory 18 all correspond to a wireless module described in the second and third embodiments.

Now, a wireless device according to the second embodiment of the present invention will be described. First, the wireless device of the second embodiment includes an antenna and a coupling element that is electrically coupled to the antenna. As shown by an example described later, if the electrical characteristics of the coupling element are changed, the radiation characteristics of the antenna electrically coupled to this coupling element are changed. By using the above principals, a plurality of radiation characteristics can be obtained by a single antenna, and by a changeover between these radiation characteristics. Thus, the effects of antenna diversity are obtained.

In the second embodiment, the antenna and coupling element are intentionally electrically coupled to each other. Then, the degree of coupling is varied.

Figure 3:
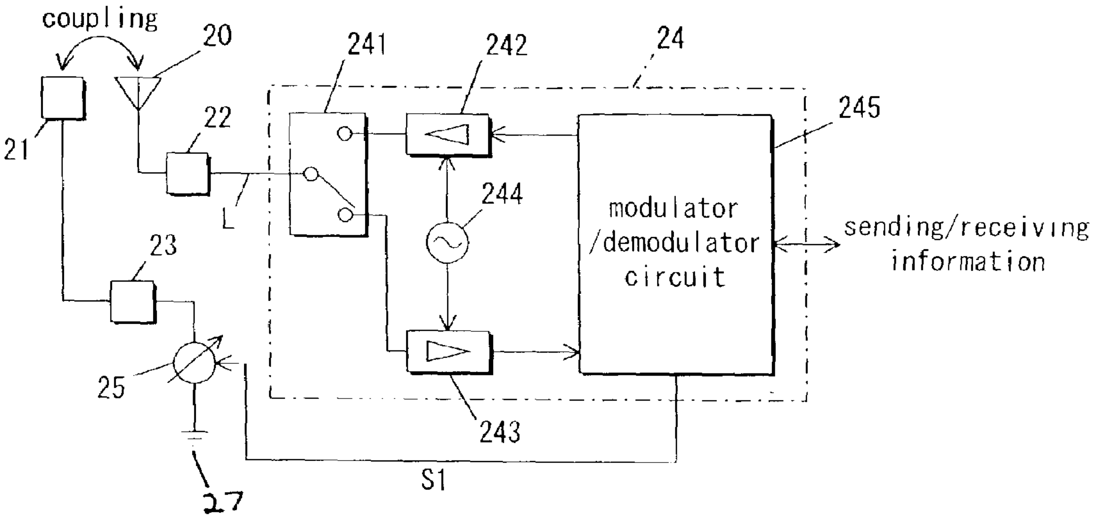
FIG. 3 is a block diagram of the wireless device according to a second embodiment of the present invention.

FIG. 3 is a block diagram of the wireless device according to the second embodiment of the present invention. In FIG. 3, an antenna 20 and a coupling element 21 are arranged contiguous with each other, and coupling element 21 is electrically coupled to antenna 20.

Antenna 20 need not be a special antenna and, for example, when the frequency band is approximately 2.4 GHz or 5 GHz and a small-sized wireless device is constructed, a surface-mounted laminated ceramic chip antenna, micro-strip line antenna, patch antenna, or spiral antenna can be used.

Coupling element 21 may be a component whose specifications are clear at the design phase (such as an antenna similar to antenna 20) and that is desirable, however, a component whose specifications are unclear at the design phase (such as a component of an electronic apparatus to which this wireless device is attached) may also be used.

A crucial point of the present embodiment is that electrical power is fed to antenna 20 for information communications and coupling element 21 is not powered. Accordingly, even if a part that could be used as an antenna is used as the coupling elemen, it will not act as an antenna, it will only act as a coupling element to be coupled to antenna 20.

After antenna 20, a matching circuit 22 is connected, and after coupling element 21, a matching circuit 23 is also connected. Matching circuits 22 and 23 contain respective filters.

After matching circuit 22, a wireless module 24 is connected via a feed line L. After matching circuit 23, a variable impedance device 25 is connected, and variable impedance device 25 is further connected to a ground point 27 of the wireless device.

Variable impedance device 25 sets an impedance between coupling element 21 and ground point 27. Variable impedance device 25 may be a switch for varying impedance between two levels, high impedance (impedance: infinite) and low impedance (impedance: 0).

By varying the impedance, the electrical characteristics of coupling element 21 are changed, and under the influence thereof, the radiation characteristics of antenna 20 are changed. Accordingly, when the above is completed, two types of radiation characteristics of antenna 20 can be obtained.

Variable impedance device 25 may be constructed by an impedance bridge or a variable resistance, and with this construction, the impedance can be varied among a greater number of levels or without levels, and thus a greater number of types of radiation characteristics can be obtained.

Wireless module 24 can have the following factors. First, a switch 241 alternatively changes over the feed line L between the sending side and receiving side. The sending side is connected to an output terminal of a power amplifier 242, and the receiving side is connected to an input terminal of a low-noise amplifier 243. A power source 244 is also connected to power amplifier 242 and low-noise amplifier 243.

Furthermore, wireless module 24 includes a modulator/demodulator circuit 245. Modulator/demodulator circuit 245 sends information obtained from outside of the wireless device and outputs this information to the power amplifier 242 during the sending phase. Modulator/demodulator circuit 245 also demodulates the waveform obtained from the low-noise amplifier 243 and outputs the received information to the outside of the wireless device during the receiving phase.

Moreover, modulator/demodulator circuit 245 outputs an impedance control signal S1 to variable impedance device 25 and controls the impedance between coupling element 21 and ground point 27. Namely, if impedance control signal S1 is changed, the radiation characteristics of antenna 20 may be changed.

EXAMPLE 1

Figure 4:
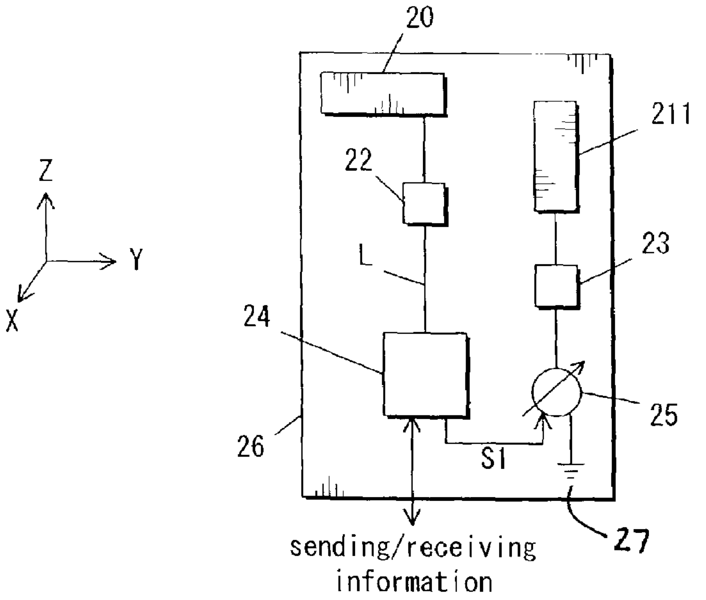
FIG. 4 is a plan view of the wireless device according to the second embodiment and first mounting embodiment of the present invention.
Figure 5A:
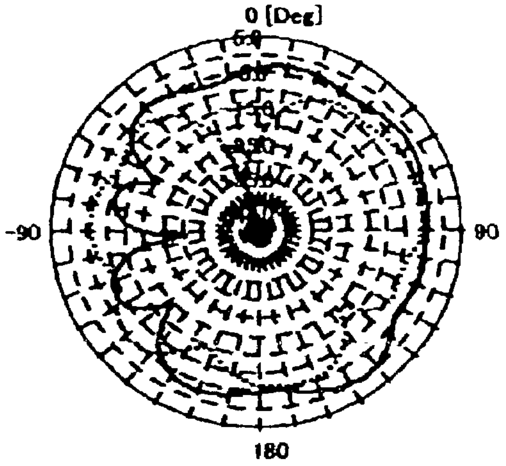
FIGS. 5(*a*) and 5(*b*) are graphs showing radiation characteristics of the antenna according to the second embodiment of the present invention.
Figure 5B:
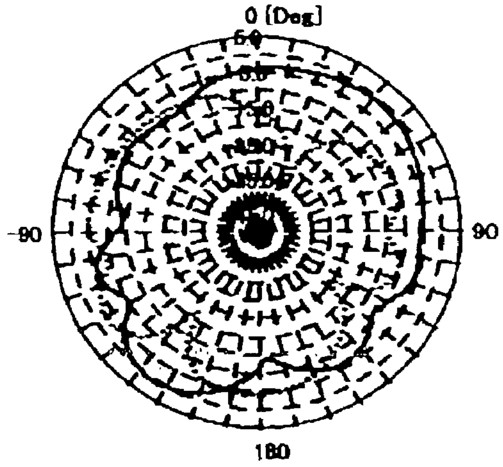

FIG. 4 illustrates a mounting embodiment according to the second embodiment of the present invention. FIGS. 5(*a*) and 5(*b*) illustrate the radiation characteristics of antenna 20 resulting from the first mounting embodiment.

In this mounting embodiment, a laminated ceramic chip antenna 211, is used as the antenna 20. On one side of a printed circuit board 26, antenna 20 and laminated ceramic chip antenna 211 are arranged to be contiguous with each other so that laminated ceramic chip antenna 211 and antenna 20 are electrically coupled to each other.

The size of printed circuit board 26 is 50 mm long and 25 mm wide, and antenna 20 and laminated ceramic chip antenna 211, may be antenna model number YCE-5208 manufactured by YOKOWO, Co., Ltd. For variable impedance device 25, a switch model number UPG152TA manufactured by NEC Corporation may be used.

In addition, a measurement was carried out using a 2.44 GHz-frequency signal at a height of 2.5 meters from the floor surface and a distance of 4 meters from the receiving side and with a wireless device according to the first mounting embodiment arranged on the sending side.

The results are illustrated in FIGS. 5(*a*) and 5(*b*). FIG. 5(*a*) shows the radiation characteristics of antenna 20 resulting from a measurement with the switch opened (that is, the impedance is infinite), wherein the direction of 0[deg] is the X-direction, and the direction of −90[deg] is the Y-direction. Similarly, FIG. 5(*b*) shows a result of a measurement with the switch closed (that is, the impedance is 0).

As can be clearly understood from a comparison between FIG. 5(*a*) and FIG. 5(*b*), only by turning the switch on or off, which corresponds to variable impedance device 25, a single antenna 20 may provide different radiation characteristics (laminated ceramic chip antenna 211 does not act as an antenna).

EXAMPLE 2

Figure 6:
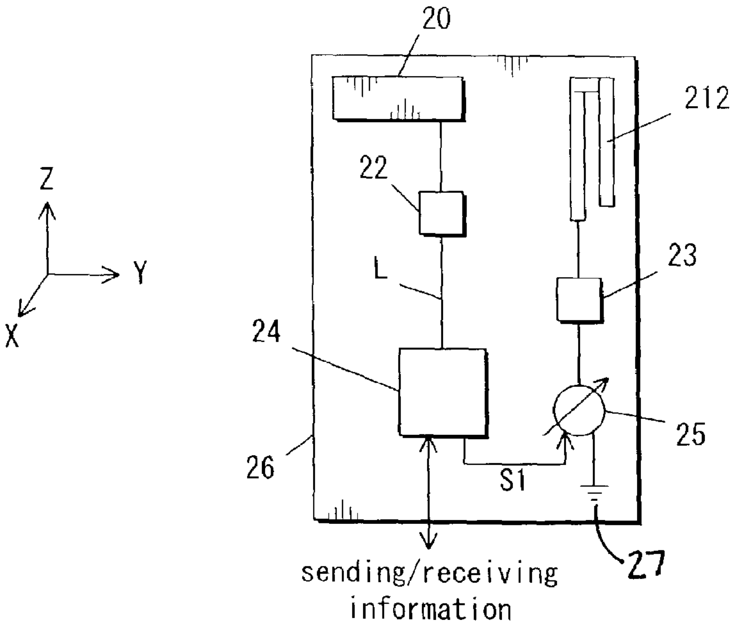
FIG. 6 is a plan view of a wireless device according to the second embodiment of the present invention.

FIG. 6 illustrates another mounting embodiment for the second embodiment of the present invention. Unlike the previous mounting embodiment, for coupling element 21, a micro-strip line antenna formed by a circuit pattern of the printed circuit board 26 was used. Other aspects were identical to those of the first mounting embodiment. Also, the measurement example is illustrated in FIGS. 7(*a*) and 7(*b*).

Figure 7A:
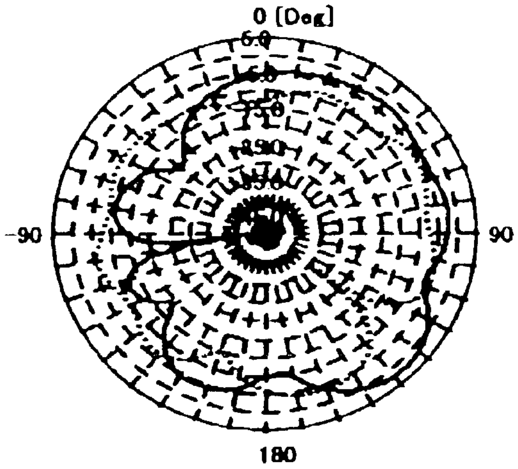
FIGS. 7(*a*) and 7(*b*) are graphs showing radiation characteristics of the antenna according to the second embodiment of the present invention.
Figure 7B:
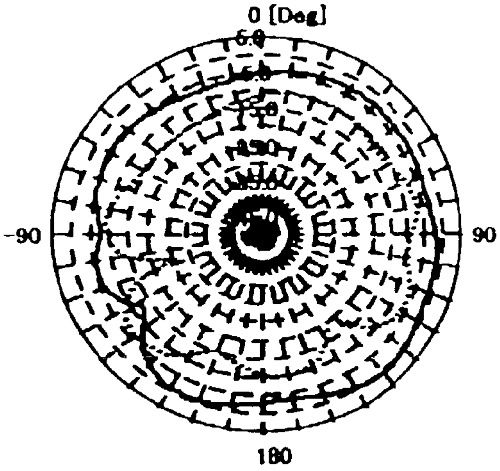

As can be clearly understood in a comparison between FIG. 7(*a*) and FIG. 7(*b*), by turning the switch on or off, which corresponds to different impedances provided by variable impedance device 25, different radiation characteristics were obtained using a single antenna 20 (micro-strip line antenna 212 does not act as an antenna).

EXAMPLES 3 AND 4

In the first and second mounting embodiments, coupling element 21 specifications were known at the design phase and were used in the design of the device. However, as shown in FIG. 8 and FIG. 9, a coupling element 21 whose specifications are unknown at the design phase may also be used.

Figure 8:
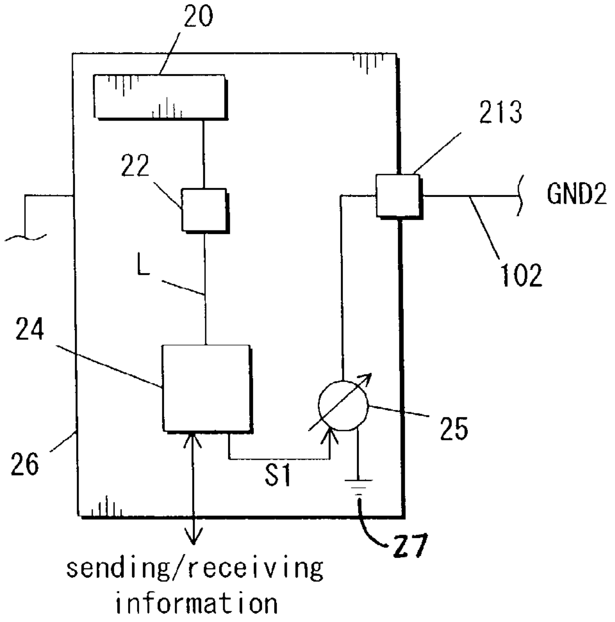
FIG. 8 is a plan view of the wireless device according to a further embodiment of the present invention.

In the embodiment shown in FIG. 8, a connection point 213 having conductivity is provided on the side of the printed circuit board 26, and variable impedance device 25 is connected to connection point 213. Then, when this wireless device is attached to an electronic apparatus, such as a personal computer, variable impedance device 25 is connected to electronic apparatus ground 102 via connection point 213.

The above configuration results in a construction almost identical to the first embodiment, and by turning on or off variable impedance device 25, two types of radiation characteristics can be obtained using a single antenna 20.

Figure 9A:
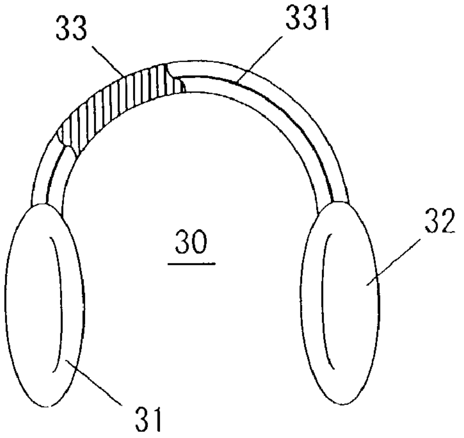
FIG. 9(*a*) is a front view of a headphone provided with the wireless device according to a further embodiment of the present invention.
Figure 9B:
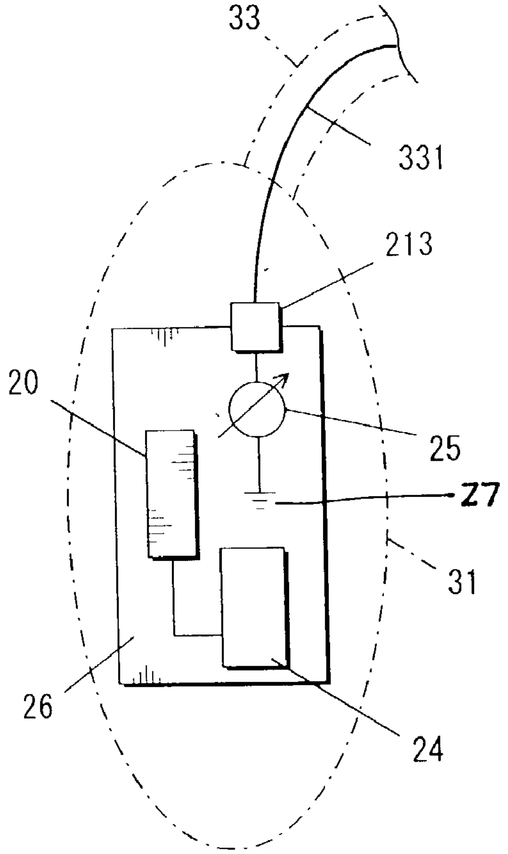

Furthermore, as shown in FIG. 9(*a*), the present invention can also be applied to a headphone 30 having an inverse U-shaped belt portion 33 and two pad portions 31 and 32 to be fixed to both ends thereof. In most cases, headphone 30 is provided with a metal wire frame 311, in general, inside the belt portion 33 for reinforcement or other purposes.

Then, as shown in FIG. 9(*b*), it is satisfactory to provide a member similar to the connection point 213 on the printed circuit board 26 and electrically connect this connection point 213 to wire frame 331.

In addition to the above, various mounting examples can be considered, and even when a coupling element 21 whose specifications are unknown in the design phase is used, effects of diversity can be obtained as long as some change in the radiation characteristics of antenna 20 are caused by turning on or off variable impedance device 25.

Figure 10:
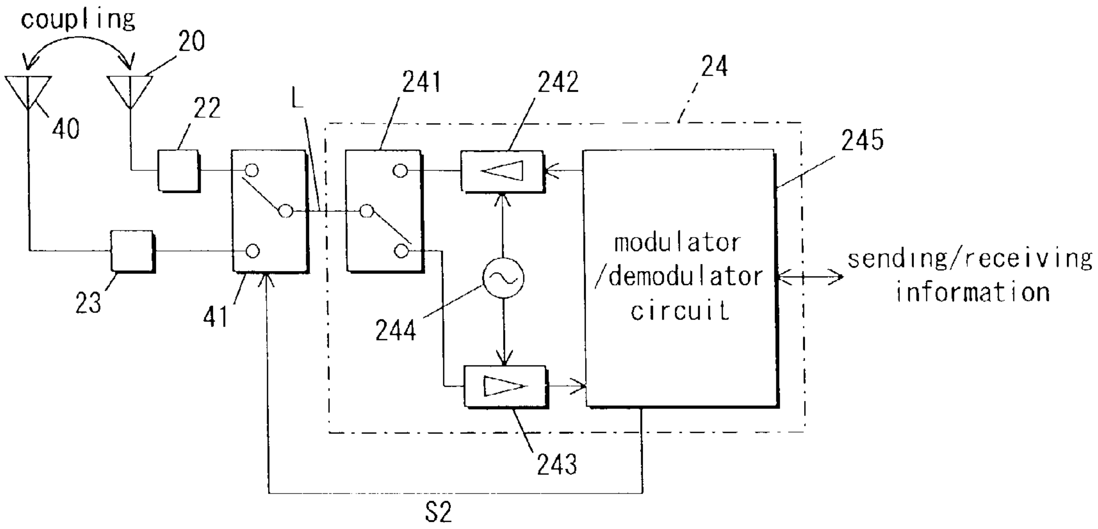
FIG. 10 is a block diagram of the wireless device according to a third embodiment of the present invention.

Referring now to FIG. 10, a block diagram of a wireless device according to the third embodiment of the present invention is illustrated. Components identical to those of the second embodiment are signified by identical symbols, whereby a description thereof will be omitted.

Figure 11:
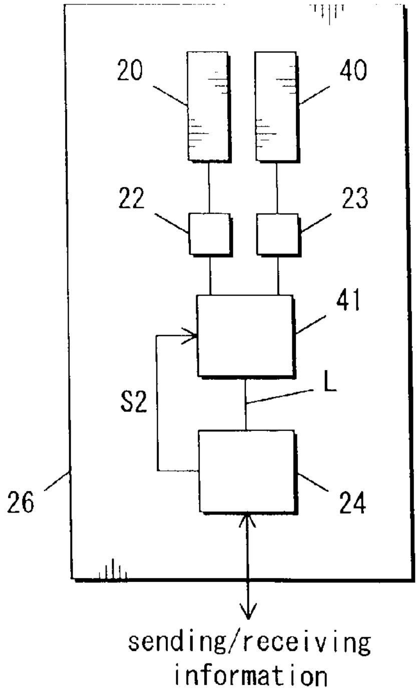
FIG. 11 is a plan view of the wireless device according to a third embodiment of the present invention.

Referring now to FIGS. 10 and 11, for the third embodiment, two surface-mounted antennas 20 and 40 are arranged contiguous with each other on one side of printed circuit board 26, whereby antennas 20 and 40 are electrically coupled to each other.

In addition, antennas 20 and 40 are not necessarily special antennas and, for example, when the frequency band is approximately 2.4 GHz or 5 GHz and a small-sized wireless device is constructed, surface-mounted laminated ceramic chip antennas, micro-strip line antennas, patch antennas, and spiral antennas can be used.

As shown in FIG. 10, an antenna changeover signal S2 is outputted from modulator/demodulator circuit 245 to an antenna switch 41. Antenna switch 41 alternatively selects either antenna 20 or 40 for use for communications in accordance with antenna changeover signal S2.

Herein, unlike the second embodiment, the selected antenna (including antenna 40) is fed with electrical power from feed line L, and thereby acts as an antenna.

In the present embodiment, even in the case where the mounting area of the antenna is narrow and effects of space diversity are hardly obtainable, effects of directional diversity can be provided.

Furthermore, the surface-mounted antennas are arranged on one surface of the circuit board in a concentrated fashion, therefore, a thin wireless device can be constructed.

In the foregoing descriptions of the second and third embodiments, examples where wireless module 24 carries out both modulation and demodulation were described. However, the present invention can also be applied to a case where wireless module 24 carries out only one of these.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A card device to be inserted into a slot of an electronic apparatus having an electronic apparatus ground and electrically connected to this electronic apparatus, comprising:
- a carrier;
- a single antenna provided on said carrier;
- a card ground disposed on said carrier and electrically connected to said antenna; and
- a switch having a first position and a second position, said first position connecting said card ground to said electronic apparatus ground, said second position disconnecting said card ground from said electronic apparatus ground.

2. The card device as set forth in claim 1, further comprising:
- a demodulating means for accepting a signal received by said antenna and for demodulating said signal;
- a judging means for accepting said demodulated signal and judging the quality of a communications state of said antenna; and
- a control means for controlling said switch using a judgment result of said judging means.

3. The card device as set forth in claim 1, wherein said antenna is a λ/4 chip antenna exposed outside said carrier.

4. The electronic apparatus in which the card device as set forth in claim 1, wherein said card device is inserted in a slot thereof.

5. A wireless device comprising:
- an antenna;
- a wireless module providing power to said antenna and transmitting information using said antenna;
- a coupling element disposed contiguous to said antenna and electrically coupled to said antenna; and
- a variable impedance device disposed between said coupling element and a ground point, wherein said wireless module operates said variable impedance device, said variable impedance device varying the impedance between said coupling element and said ground point, so that a plurality of radiation characteristics are obtained by said antenna.

6. The wireless device as set forth in claim 5, wherein said variable impedance device provides a high impedance level and a low impedance level.

7. The wireless device as set forth in claim 5, wherein said coupling element includes a powerless antenna element.

8. The wireless device as set forth in claim 5, wherein said coupling element includes a circuit pattern.

9. The wireless device as set forth in claim 5, wherein said coupling element is a component of an electronic apparatus, said wireless device being attached to said electronic apparatus.

10. The wireless device as set forth in claim 9, wherein said component includes a ground.

11. The wireless device as set forth in claim 9, wherein said component includes a wire frame.

12. A method of obtaining antenna diversity from an antenna, comprising the steps of:
- providing a card ground disposed on a carrier and electronically connected to said antenna; and
- switching between a first position and a second position, said first position connecting said card ground to an electronic apparatus ground, said second position disconnecting said card ground from said electronic apparatus ground, and said first position and said second position being positions operable for communication by the antenna.

13. The method as set forth in claim 12, further comprising the steps of:
- accepting a signal received by said antenna;
- demodulating said signal;
- accepting said demodulated signal;
- judging the quality of a communications state of said antenna; and
- controlling said switch using a judgment result.

14. A method of obtaining antenna diversity from an antenna comprising the steps of:
- providing a card ground disposed on a carrier and electronically connected to said antenna;
- switching between a first position and a second position, said first position connecting said card ground to an electronic apparatus ground, said second position disconnecting said card ground from said electronic apparatus ground;
- accepting a signal received by said antenna;
- demodulating said signal;
- accepting said demodulated signal;
- judging the quality of a communications state of said antenna; and
- controlling said switch using a judgment result.

* * * * *